United States Patent [19]

Fayling

[11] Patent Number: 4,743,490
[45] Date of Patent: May 10, 1988

[54] COUNTERFEIT-RESISTANT MAGNETIC RECORDING TAPE

[75] Inventor: Richard E. Fayling, White Bear Lake, Minn.

[73] Assignee: Minnesota Mining and Manufacturing Company, St. Paul, Minn.

[21] Appl. No.: 832,141

[22] Filed: Feb. 24, 1986

[51] Int. Cl.$^4$ .............................................. G11B 5/70
[52] U.S. Cl. ................................... 428/212; 427/131; 428/323; 428/694; 428/900
[58] Field of Search ............... 428/694, 900, 212, 323; 427/128, 131; 283/82

[56] References Cited

U.S. PATENT DOCUMENTS

| | | | |
|---|---|---|---|
| 3,219,353 | 11/1965 | Prentky | 274/41.4 |
| 3,328,195 | 6/1967 | May | 117/69 |
| 3,566,356 | 2/1971 | Holm et al. | 340/149 |
| 3,617,378 | 11/1971 | Beck | 117/226 |
| 3,878,367 | 4/1975 | Fayling | 235/61.12 M |
| 3,986,205 | 10/1976 | Fayling | 360/2 |
| 4,090,662 | 5/1978 | Fayling | 235/493 |
| 4,104,513 | 8/1978 | Pearce | 235/450 |
| 4,442,159 | 4/1984 | Dezawa et al. | 427/128 |
| 4,511,617 | 4/1985 | Hideyama et al. | 428/694 |

FOREIGN PATENT DOCUMENTS 1331604 9/1973 United Kingdom .

OTHER PUBLICATIONS

Fayling: "Anisotropic Erasure and Demagnetization Characteristics of Recording Tapes Comprising Particles with Uniaxial Magnetocrystalline Anisotropy," IEEE Transactions on Magnetics, vol. MAG-13, No. 5, Sep. 1977, pp. 1391–1393.

Primary Examiner—Paul J. Thibodeau
Attorney, Agent, or Firm—Donald M. Sell; James A. Smith; Warren R. Bovee

[57] ABSTRACT

Some prior magnetic recording tapes have a backside layer of electrically conductive particles and friction-imparting nonmagnetic particles in a nonmagnetic binder. The novel tape differs in that the nonmagnetic particles are replaced by high-$H_c$ ferromagnetic particles, onto which may be recorded a distinctive magnetic pattern. This provides a "magnetic watermark" that should protect recordings from being counterfeited, because if one were to copy a recording onto ordinary magnetic recording tape, the copy would lack the "watermark". This should inhibit unauthorized copying of video recordings such as motion pictures.

16 Claims, 1 Drawing Sheet

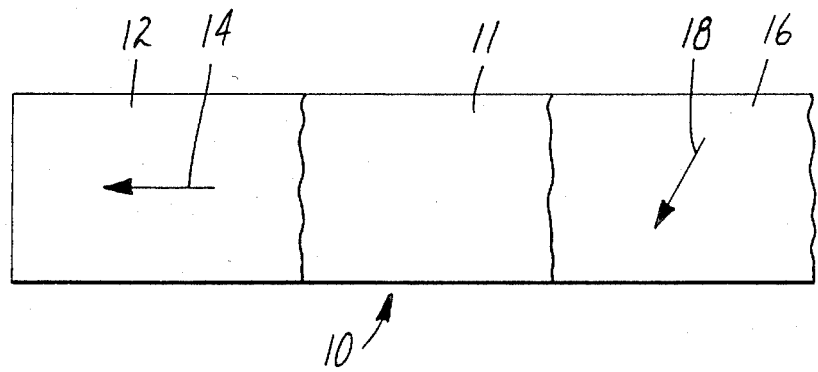

COUNTERFEIT-RESISTANT MAGNETIC RECORDING TAPE

FIELD OF THE INVENTION

The invention concerns magnetic recording tape, especially videocassette tape, which has an electrically conductive layer that serves to bleed off static charges, thus enhancing its winding properties. The invention makes use of such an electrically conductive layer.

BACKGROUND ART

Purveyors of prerecorded video tapes are distressed by the prevalence of counterfeiting but, prior to the present invention, there has been no convenient means of distinguishing between a counterfeit and a genuine recording. This problem is particularly vexing, because a video recording can be copied so easily and inexpensively onto blank tapes, the value of which may be a small fraction of that of the recording. The problem especially concerns purveyors of videocassettes that have been prerecorded with motion pictures, because a huge market has developed for their rental and sale.

Although I am unaware of any prior art that either deals with this particular problem or provides a magnetic recording video tape that would be counterfeit-resistant, British Patent Specification No. 1,331,604 (Pearce et al.) describes a magnetic recording medium comprising a magnetizable layer which includes a pattern of regions of magnetically anisotropic material that is oriented in a predetermined direction, while the balance of the layer is either unoriented or oriented at right angles to said predetermined direction. The pattern of regions provides a "magnetic watermark" which serves to identify and authenticate the medium that may take the form of a key, a credit card, passport, or the like. U.S. Pat. No. 4,104,513 (Pearce) describes a similar medium except that in areas outside the pattern of regions, the magnetically anisotropic material is oriented at angles other than right angles to the orientation inside the pattern of regions. Neither the Pearce et al. nor the Pearce medium would be useful for video recording.

U.S. Pat. No. 3,566,356 (Holm et al.) discloses a magnetic recording medium comprising magnetizable particles of differing $H_c$ which either may be combined into a single layer or may be in separate layers, e.g., a surface layer of gamma-$Fe_2O_3$ particles and an under layer of barium ferrite particles having substantially higher $H_c$ than the gamma-$Fe_2O_3$. The Holm patent discloses a sophisticated test for validating the medium, e.g., as a recordable stripe of a credit card, but does not suggest its use for video recording. Nor would the Holm medium be useful for video recording use unless the magnetizable particles of differing $H_c$ were in separate layers, and only those of a surface layer were of sufficiently low $H_c$ to be susceptible to video signals as well as the accompanying audio signals.

My U.S. Pat. Nos. 3,878,367; 3,986,205; and 4,090,662 concern magnetic recording media wherein, as in the Holm patent, the magnetizable particles are selected or oriented to provide validation of the media or documents to which the media are attached, e.g., a credit card. Only magnetic recording media of the latter two of my three patents could be commercially practical for video recording and then only when containing a surface magnetizable layer which is susceptible to video recording and an inner magnetizable layer which is not.

U.S. Pat. No. 3,219,353 (Prentky) discloses a magnetic recording medium for data storage having two magnetizable layers separated by a layer of non-magnetic shielding material. The coercivity ($H_c$) of the outer layer is approximately 130 Oersteds and that of the inner layer is approximately 1000 Oersteds. The inner layer is recorded permanently with servo signals, and data signals can be recorded and read on the outer layer without disturbing or being disturbed by the servo signals. Although the patent does not say so, the servo signals could be a "magnetic watermark". U.S. Pat. No. 3,328,195 (May) discloses a magnetic recording medium similar to that of the Prentky patenet.

Video tapes, especially videocassette tapes of the "Betamax" and "VHS" formats, often have in addition to the magnetizable layer, an electrically conductive layer which serves to bleed off static charges. Usually the electrically conductive layer is on the backside of the tape and may be formulated to provide sufficient roughness and frictional characteristics for slip-free driving. A magnetic recording tape having such an electrically conductive backside layer is disclosed in U.S. Pat. No. 3,617,378 (Beck), although the patent does not mention video utility. The backside layer of the Beck patent includes nonmagnetic alpha-$Fe_2O_3$ particles to impart the desired coefficient of friction.

DISCLOSURE OF INVENTION

The invention provides a magnetic recording tape which like that of the Beck patent comprises a flexible backing carrying a magnetic recording layer plus a backside surface layer comprising electrically conductive particles in a nonmagnetic binder. The novel tape differs from that of the Beck patent in that the backside layer includes ferromagnetic particles, the $H_c$ of which is sufficiently high that they are not affected by the recording of signals onto the magnetic recording layer, and the $B_r$ of which is sufficiently low that when recorded in a distinctive magnetic pattern, their fields do not interfere with the magnetic recording layer. A low $B_r$ also ensures against detection of the distinctive magnetic pattern by a head reading signals from the magnetic recording layer. A distinctive magnetic pattern recorded onto the high-$H_c$ ferromagnetic particles provides a "magnetic watermark" that should protect recordings from being counterfeited.

By sufficiently high $H_c$ is meant that the ferromagnetic particles of the backside layer retain at least 70% of their recorded signal, preferably at least 95% during the recording or erasing of signals on the magnetic recording layer. An $H_c$ of 2000 Oersteds should be sufficiently high, measured in the direction at which signals are recorded onto the magnetic recording layer. An $H_c$ substantially less than 2000 Oersteds is acceptable when (1) the ferromagnetic particles of the backside layer are oriented so that their easy axes of magnetization extend substantially transversely to the easy axis of magnetization of the magnetic recording layer and (2) those ferromagnetic particles are exceptionally anisotropic and thus have extraordinary erasure resistance in the hard-axis direction as described in Fayling: "Anisotropic Erasure and Demagnetization Characterisitcs of Recording Tapes Comprising Particles with Uniaxial Magnetocrystalline Anisotropy," IEEE Transactions on Magnetics, Vol. MAG-13, No. 5, September 1977, pages 1391-3. See also Fayling: "Unusual Magnetic Recording Applications Utilizing Highly Anisotropic Recording Materials," IEEE Transactions on Magnetics, Vol. MAG-15, No. 6, November 1979, pages 1567-9.

In all current videotapes, the magnetic recording layer has an easy axis of magnitization, longitudinal for helical scan and substantially transverse for quadraplex mechanisms. In a quadraplex videotape of the invention, the ferromagnetic particles of the backside layer may be oriented in the longitudinal direction. In a helical-scan videotape of the invention, the ferromagnetic particles of the backside layer may have their easy axes oriented at an angle of more than 45° to the longitudinal direction, preferably substantially in the transverse direction. This may be accomplished by the same orienting apparatus that has been widely used for many years in the production of quadraplex video tape.

The distinctive magnetic pattern should be recorded onto the backside layer with a head that is oriented with its gap edges extending perpendicularly to the easy axes of magnetization of the ferromagnetic particles of the backside layer. Upon doing so when there is a substantial angle between those easy axes and the easy axis of the magnetic recording layer, that signal is less likely to be detected by the video head.

Whether or not the easy axes of magnetization of the ferromagnetic particles of the backside layer are oriented at a substantial angle to the easy axis of magnetization of the recording layer, their $H_c$ preferably is at least 3000 oersteds to provide a margin of safety against their being affected by the recording of signals onto the magnetic recording layer. On the other hand, the $H_c$ of the ferromagnetic particles of the backside layer should not exceed 6000 oersteds, above which equipment to magnetize it would be impractical in the current state of the art.

Ideally, the distinctive magnetic pattern is at least partially digital, thus allowing duplicators many changes in codes to identify and differentiate their genuine products while also distinguishing their genuine products from genuine products of other duplicators. Techniques for recording onto layers of high-$H_c$ ferromagnetic material are taught in Szczech et al.: "The Effects of Recorded Head Saturation on Digital Output," IEEE Transactions on Magnetics, Vol. MAG-12, No. 6, November 1976, pages 707-709.

Preferably the ferromagnetic particles of the backside layer comprise from 1 to 30% by volume of the backside layer. At much less than 1%, reproductions of the distinctive magnetic pattern may not be desirably sharp, especially when the pattern is digital. At more than 30%, the $B_r$ may be too high, thus creating hazards such as print or modulation of signals reproduced from the magnetic recording layer. Such hazards can be minimized by optimum selection of wavelengths and flux transition lengths.

The backside layer of the novel magnetic recording tape provides optimum tape-driving performance when the high-$H_c$ ferromagnetic particles are approximately equidimensional, i.e., have an aspect ratio of less than 2 to 1, and are about 0.3 micrometer in size. At more than about 2 micrometers, the ferromagnetic particles of the backside layer might leave undesirable impressions in the magnetic recording layer when the tape is wound upon itself in roll form. At less than about 0.1 micrometer, the ferromagnetic particles of the backside layer might not impart the desired frictional characteristics.

By dispersing the ferromagnetic particles throughout an electrically conductive backside layer of a magnetic recording tape and recording those particles with a distinctive magnetic pattern before recording the magnetic recording layer, it should be possible to detect whether a prerecorded tape is counterfeit unless the counterfeiter either is able to secure and use tape of the invention to make copies or has sufficient capital and skill to make his own tape. To make such a tape should be impossible for almost every counterfeiter. Another obstacle to a counterfeiter would be the difficulty of procuring special high-field recording heads and electronic components capable of supplying high recording currents to record the distinctive patterns onto ferromagnetic particles of the backside layer. If, instead, a counterfeiter were to use ordinary magnetic recording tape, the copy would lack the distinctive magnetic pattern, thus enabling an investigator to distinguish the original from the copy by testing for the presence of the magnetic pattern.

Because the electrically conductive layer is on the backside of the tape, (1) the distinctive magnetic pattern recorded on the ferromagnetic particles of the backside layer is protected by the thickness of the flexible backing from being affected by and from affecting the recording and playback of signals on the magnetic recording layer, and (2) the distinctive magnetic pattern can be readily tested without disrupting signals recorded on the magnetic recording layer. Since many magnetic recording tapes already have electrically conductive backside coatings containing particles (such as the nonmagnetic alpha-$Fe_2O_3$ of the above-cited Beck patent) tp provide better tape-driving characteristics and the ferromagnetic particles of the backside layer can serve this function, the novel tape need not be any thicker than are current commercial tapes. The ability to provide a "magnetic watermark" without increasing the tape thickness is especially important in videocassette tapes because of the need to load a given length into the limited space provided by standard cassettes. If the ferromagnetic particles of the backside layer were to have their own layer, this would not only entail the cost of a separate manufacturing step, but would necessarily increase the tape thickness.

A counterfeit-resistant magnetic recording tape of the invention can be made by:

(1) applying a magnetic recording layer to the faceside of a flexible backing, (2) applying to the flexible backing a backside surface layer comprising a nonmagnetic binder containing electrically conductive particles and ferromagnetic particles as described above, and (3) recording a distinctive magnetic pattern onto the ferromagnetic particles of the backside layer. The magnetic recording layer may then be used as if there were no ferromagnetic particles in the backside layer, the only function of which is to provide a "magnetic watermark".

A preferred class of materials for ferromagnetic particles of the backside layer comprises magnetizable particles which have a hexagonal crystal structure, e.g., barium ferrite. These particles have a single easy axis of magnetization and are readily available at moderate cost with an $H_c$ within the preferred 3000-6000 oersted range. Furthermore, barium ferrite particles are readily available that are roughly equidimensional and of a size suiting them to be used to provide good frictional characteristics to a backside coating, especially for videocassette use.

THE DRAWING

The invention may be more readily understood with reference to the drawing which shows a helical-scan videotape of the invention, portions thereof broken away.

The videotape 10 shown in the drawing has a flexible backing 11, on the faceside of which is a magnetizable layer 12 of acicular iron oxide particles, the easy axes of which have been oriented in the longitudinal direction as indicated by the arrow 14. On the backside of the backing is a layer 16 which comprises electrically conductive carbon black and ferromagnetic particles, e.g., barium ferrite particles. The easy axes of the barium ferrite particles have been oriented in a substantially transverse direction indicated by the arrow 18.

A preferred magnetic recording tape of the invention may be constructed as follows:

EXAMPLE 1

A magnetic recording tape suitable as a helical-scan videotape may be made using a biaxially oriented poly(ethylene terephthalate) film backing about 0.015 mm in thickness. First, a backside layer is prepared as follows:

|  | Parts by Weight |
| --- | --- |
| Charge A |  |
| Methylethyl ketone | 620 |
| Dispersing agent | 5 |
| Electrically conductive carbon black particles about 18 nm in diameter, surface area 1000 m²/g ("Ketjenblack" EC) | 50 |
| Substantially equidimensional barium ferrite particles having an $H_c$ of 4000 oersteds and a diameter of 0.3 micrometer | 5 |
| Phenoxy resin ("UCAR PKHH") | 10 |
| Charge B |  |
| Polyurethane resin ("Estane" 5701) | 125 |
| Methylethyl ketone | 125 |
| Cyclohexanone | 90 |
| Charge C |  |
| Methylethyl ketone | 210 |
| Toluene | 70 |
| Charge D |  |
| Methylethyl ketone | 265 |
| Toluene | 90 |
| Charge E |  |
| Polymethylene polyphenylisocyanate (Upjohn "PAPI") | 25 |

Charge A is stirred in a blade mixer until homogeneous and charged to a sandmill which is operated for two hours. Charge B is then stirred in a blade mixer until homogeneous and added to the sandmill. Operation of the sandmill is continued until handspread samples indicate a smooth dispersion. Charge C is then added slowly to the sandmill, and when the dispersion is again homogeneous, the final solids are adjusted using Charge D to provide a viscosity suitable for a thin coating. Sandmilling ceases when the dispersion is judged smooth and homogeneous. The dispersion is transferred to a blade mixer, and Charge E added slowly under mixing. Mixing continues for 5 minutes after the last of Charge E is added, and the resulting dispersion is promptly coated onto the backside of the film backing. After magnetically orienting the barium ferrite particles so that their easy axes extend substantially transversely and heating to drive off volatiles and cure the binder, the final coating thickness should be about 0.002 mm. A magnetizable coating is then coated onto the frontside and magnetically oriented to provide an easy axis of magnetization in the longitudinal direction as required for helical-scan video tape.

I claim:

1. Magnetic video recording tape comprising a flexible backing carrying a faceside magnetic recording layer and a backside surface layer comprising electrically conductive particles in a nonmagnetic binder, wherein the improvement comprises:

the backside layer includes ferromagnetic particles, the $H_c$ of which is sufficiently high that they are not affected by the recording of signals onto the magnetic recording layer, and the $B_r$ of which is sufficiently low that when recorded in a distinctive magnetic pattern, their fields do not interfere with signals of the magnetic recording layer.

2. Magnetic recording tape as defined in claim 1 wherein the ferromagnetic particles of the backside layer comprise from 1 to 30 volume percent of that layer.

3. Magnetic recording tape as defined in claim 2 wherein the ferromagnetic particles of the backside layer an $H_c$ of at least 2000 oersteds.

4. Magnetic recording tape as defined in claim 3 wherein the $H_c$ of the ferromagnetic particles of the backside layer is from 3000 to 6000 oersteds.

5. Magnetic recording tape as defined in claim 3 wherein the ferromagnetic particles of the backside layer have a hexagonal crystal structure.

6. Magnetic recording tape as defined in claim 5 wherein the ferromagnetic particles of the backside layer comprise barium ferrite.

7. Magnetic recording tape as defined in claim 6 wherein the magnetic recording layer has an easy axis of magnetization, and the barium ferrite particles are oriented with their easy axes primarily extending at an angle of more than 45° to the easy axis of magnetization of the magnetic recording layer.

8. Magnetic recording tape as defined in claim 7 wherein the easy axis of magnetization of the magnetic recording layer extends in the longitudinal direction and the easy axes of the ferromagnetic particles of the backside layer are oriented in a substantially transverse direction.

9. Magnetic recording tape as defined in claim 1 wherein the ferromagnetic particles of the backside layer are substantially equidimensional.

10. Magnetic recording tape as defined in claim 9 wherein the ferromagnetic particles of the backside layer are from 0.1 to 2 micrometers in size.

11. Magnetic recording tape as defined in claim 10 wherein the ferromagnetic particles of the backside layer are about 0.3 micrometer in size.

12. Magnetic recording tape as defined in claim 1 wherein the ferromagnetic particles of the backside layer are magnetized in a distinctive pattern which is reproducible at least in part as digital signals.

13. Videocassette containing a magnetic recording tape as defined in claim 1.

14. Method of making a counterfeit-resistant magnetic video recording tape comprising the steps of
(1) applying a magnetic recording layer to the faceside of a flexible backing,
(2) applying to the flexible backing a backside surface layer comprising electrically conductive particles and ferromagnetic particles in a nonmagnetic binder, the $H_c$ of the ferromagnetic particles being sufficiently high that they are not affected by the recording of signals onto the magnetic recording layer, and the $B_r$ of which is sufficiently low that when recorded in a distinctive magnetic pattern, their fields do not interfere with signals of the magnetic recording layer, and (3) recording a distinctive magnetic pattern onto the ferromagnetic particles of the backside layer.

15. Method as defined in claim 14 wherein the pattern applied in step (3) is reproducible at least in part as digital signals.

16. Magnetic recording tape as defined in claim 1 wherein the ferromagnetic particles in the backside layer are approximately equidimensional and are between 0.1 and 2 micrometers in size.

* * * * *